US009886718B2

(12) United States Patent
Knapp et al.

(10) Patent No.: US 9,886,718 B2
(45) Date of Patent: Feb. 6, 2018

(54) AUCTION FOR EACH INDIVIDUAL AD IMPRESSION

(75) Inventors: Jason J. A. Knapp, Solana Beach, CA (US); Fabrizio Blanco, Los Angeles, CA (US)

(73) Assignee: THE RUBICON PROJECT, INC., Playa Vista, CA (US)

(*) Notice: Subject to any disclaimer, the term of this patent is extended or adjusted under 35 U.S.C. 154(b) by 972 days.

(21) Appl. No.: 11/959,385

(22) Filed: Dec. 18, 2007

(65) Prior Publication Data

US 2008/0162329 A1 Jul. 3, 2008

Related U.S. Application Data (60) Provisional application No. 60/876,026, filed on Dec. 19, 2006.

(51) Int. Cl.
*G06Q 40/00* (2012.01)
*G06Q 30/08* (2012.01)
*G06Q 30/02* (2012.01)
*G06Q 40/04* (2012.01)

(52) U.S. Cl.
CPC .......... *G06Q 30/08* (2013.01); *G06Q 30/02* (2013.01); *G06Q 40/04* (2013.01)

(58) Field of Classification Search
CPC ......... G06Q 30/02; G06Q 30/08; G06Q 40/04
USPC .......... 705/35–40, 14.71, 14.73, 14; 707/999
See application file for complete search history.

(56) References Cited

U.S. PATENT DOCUMENTS

| 6,285,987 B1 | 9/2001 | Roth et al. |
| 6,324,519 B1 | 11/2001 | Eldering |
| 6,487,538 B1 | 11/2002 | Gupta et al. |
| 6,546,427 B1 | 4/2003 | Ehrlich et al. |
| 6,725,203 B1 | 4/2004 | Seet et al. |
| 6,763,334 B1 | 7/2004 | Matsumoto et al. |
| 7,038,637 B1 | 5/2006 | Eller et al. |

(Continued)

FOREIGN PATENT DOCUMENTS

| CA | 2673352 | 6/2009 |
| JP | 2002163549 A | 6/2002 |

(Continued)

OTHER PUBLICATIONS

Edelman et al "Internet Advertising and the Generalized Second Price Auction: Selling Billions of Dollars Worth of Keywords", Working Paper 11765, National Bureau of Economic Research, Cambridge, MA 02138, Nov. 2005.*

(Continued)

*Primary Examiner* — Edward Baird
(74) *Attorney, Agent, or Firm* — Knobbe, Martens, Olson & Bear LLP (57) ABSTRACT

In one aspect, there is provided a method for polling, by a script at a browser, one or more servers by sending messages to the one or more servers. The one or more messages may solicit one or more bids for presenting an ad at the browser. The one or more messages may also enable access to information at the browser. The information may be relevant to the one or more servers making the one or more bids. The script may receive one or more responses from the one or more servers. The one or more responses include the one or more bids. The script may also evaluate the one or more bids, and select one of the bids based on the evaluation.

10 Claims, 4 Drawing Sheets

(56) References Cited

U.S. PATENT DOCUMENTS

| | | | |
|---|---|---|---|
| 7,085,732 B2 | 8/2006 | Gould | |
| 7,428,555 B2 | 9/2008 | Yan | |
| 7,958,040 B2 | 6/2011 | Jain | |
| 8,472,728 B1 | 6/2013 | Chau et al. | |
| 8,473,346 B2 | 6/2013 | Mattern et al. | |
| 8,554,683 B2 | 10/2013 | Knapp et al. | |
| 8,831,987 B2 | 9/2014 | Knapp et al. | |
| 2002/0029186 A1 | 3/2002 | Roth et al. | |
| 2002/0107787 A1 | 8/2002 | Mashinsky et al. | |
| 2002/0143901 A1 | 10/2002 | Lupo et al. | |
| 2002/0165849 A1 | 11/2002 | Singh et al. | |
| 2002/0169760 A1* | 11/2002 | Cheung et al. | 707/3 |
| 2003/0033292 A1 | 2/2003 | Meisel et al. | |
| 2003/0055729 A1 | 3/2003 | Bezos et al. | |
| 2003/0135460 A1 | 7/2003 | Talegon | |
| 2003/0195837 A1 | 10/2003 | Kostic et al. | |
| 2003/0212762 A1 | 11/2003 | Barnes | |
| 2003/0220866 A1 | 11/2003 | Pisaris-Henderson et al. | |
| 2004/0039733 A1* | 2/2004 | Soulanille | G06F 17/30864 |
| 2004/0044571 A1 | 3/2004 | Bronnimann et al. | |
| 2004/0111319 A1 | 6/2004 | Matsumoto et al. | |
| 2004/0133469 A1 | 7/2004 | Chang | |
| 2004/0148222 A1 | 7/2004 | Sabella et al. | |
| 2004/0199397 A1* | 10/2004 | Dresden | G06Q 30/02 705/1.1 |
| 2004/0267612 A1 | 12/2004 | Veach | |
| 2004/0267878 A1* | 12/2004 | Osias | 709/203 |
| 2005/0021440 A1* | 1/2005 | Dresden | G06Q 30/02 705/37 |
| 2005/0027594 A1 | 2/2005 | Yasnovsky et al. | |
| 2005/0033682 A1 | 2/2005 | Levy et al. | |
| 2005/0038900 A1 | 2/2005 | Krassner et al. | |
| 2005/0137939 A1 | 6/2005 | Calabria et al. | |
| 2005/0144064 A1 | 6/2005 | Calabria et al. | |
| 2005/0216335 A1 | 9/2005 | Fikes et al. | |
| 2005/0228736 A1 | 10/2005 | Norman et al. | |
| 2005/0228746 A1 | 10/2005 | McHale et al. | |
| 2005/0267805 A1 | 12/2005 | Tarantino | |
| 2006/0047579 A1* | 3/2006 | Dresden | G06Q 10/00 705/14.54 |
| 2006/0074752 A1 | 4/2006 | Newmark | |
| 2006/0095281 A1* | 5/2006 | Chickering | G06Q 30/02 705/37 |
| 2006/0095336 A1 | 5/2006 | Heckerman et al. | |
| 2006/0106709 A1 | 5/2006 | Chickering et al. | |
| 2006/0106710 A1 | 5/2006 | Meek et al. | |
| 2006/0122907 A1 | 6/2006 | Gould | |
| 2006/0129453 A1 | 6/2006 | Gardner et al. | |
| 2006/0178900 A1 | 8/2006 | Shilo et al. | |
| 2006/0184417 A1 | 8/2006 | Van der Linden | |
| 2006/0190333 A1 | 8/2006 | Choi | |
| 2006/0190385 A1* | 8/2006 | Dresden | G06Q 30/02 705/37 |
| 2006/0200445 A1* | 9/2006 | Chen et al. | 707/2 |
| 2006/0212350 A1* | 9/2006 | Ellis et al. | 705/14 |
| 2006/0212351 A1 | 9/2006 | Funahashi | |
| 2006/0224447 A1 | 10/2006 | Koningstein | |
| 2006/0224496 A1 | 10/2006 | Sandholm et al. | |
| 2006/0271426 A1 | 11/2006 | Borgs et al. | |
| 2006/0271429 A1 | 11/2006 | Borgs et al. | |
| 2006/0282328 A1* | 12/2006 | Gerace et al. | 705/14 |
| 2006/0287916 A1 | 12/2006 | Starr et al. | |
| 2007/0027768 A1 | 2/2007 | Collins et al. | |
| 2007/0055577 A1 | 3/2007 | Ashton | |
| 2007/0087756 A1 | 4/2007 | Hoffberg | |
| 2007/0121848 A1 | 5/2007 | Faber et al. | |
| 2007/0130009 A1 | 6/2007 | Steelberg et al. | |
| 2007/0174118 A1 | 7/2007 | Dekel | |
| 2007/0208630 A1 | 9/2007 | Chatter et al. | |
| 2007/0260514 A1 | 11/2007 | Burdick | |
| 2008/0046924 A1 | 2/2008 | Hood | |
| 2008/0052195 A1 | 2/2008 | Roth | |
| 2008/0162329 A1 | 7/2008 | Knapp et al. | |
| 2008/0195458 A1* | 8/2008 | Anschutz et al. | 705/10 |
| 2009/0006192 A1 | 1/2009 | Martinez | |
| 2009/0006375 A1 | 1/2009 | Lax | |
| 2009/0012903 A1 | 1/2009 | Subramanian et al. | |
| 2009/0037277 A1 | 2/2009 | Zuckerberg | |
| 2009/0043648 A1 | 2/2009 | Mahdian et al. | |
| 2009/0083190 A1 | 3/2009 | Isshiki et al. | |
| 2009/0234713 A1 | 9/2009 | Bi et al. | |
| 2009/0327029 A1 | 12/2009 | Collins | |
| 2009/0327084 A1 | 12/2009 | Patton et al. | |
| 2010/0057556 A1 | 3/2010 | Rousso et al. | |
| 2010/0082472 A1 | 4/2010 | Cheung | |
| 2010/0145809 A1* | 6/2010 | Knapp et al. | 705/14.71 |
| 2011/0225608 A1 | 9/2011 | Lopatecki et al. | |
| 2011/0258049 A1 | 10/2011 | Ramer et al. | |
| 2012/0209710 A1 | 8/2012 | Ramer et al. | |
| 2013/0282478 A1 | 10/2013 | Mattern et al. | |
| 2014/0172573 A1 | 6/2014 | Saurabh | |
| 2017/0024778 A1* | 1/2017 | Knapp | G06Q 30/02 |

FOREIGN PATENT DOCUMENTS

| | | | |
|---|---|---|---|
| WO | WO 2000/33163 A2 | 6/2000 | |
| WO | WO 2000/33163 A3 | 6/2000 | |
| WO | WO 2000/41105 | 7/2000 | |
| WO | WO 2001/43027 | 4/2001 | |
| WO | WO 2003/025823 | 3/2003 | |
| WO | WO 2003/058531 | 7/2003 | |
| WO | WO 2004/068299 | 8/2004 | |
| WO | WO 2005/11674 | * 12/2005 | G06F 17/30 |
| WO | WO 2006/026030 | 3/2006 | |
| WO | WO 2006/062760 | 6/2006 | |
| WO | WO 2006/096768 | 9/2006 | |
| WO | WO 2006/097826 | 9/2006 | |
| WO | WO 2006/104854 | 10/2006 | |
| WO | WO 2006/127645 | 11/2006 | |
| WO | WO 2006/128104 | 11/2006 | |
| WO | WO 2008/077078 | 6/2008 | |

OTHER PUBLICATIONS

U.S. Appl. No. 60/323,060, filed Sep. 18, 2001, Gould.
U.S. Appl. No. 60/344,100, filed Dec. 28, 2001, Pisaris-Henderson et al.
U.S. Appl. No. 60/701,615, filed Jul. 21, 2005, Klopf.
U.S. Appl. No. 10/351,689, filed Jan. 24, 2003, Sabella et al.
U.S. Appl. No. 11/096,283, filed Mar. 31, 2005, Koningstein.
PCT International Search Report dated Apr. 23, 2008 for PCT Application No. PCT/US07/88002.
Canadian Office Action dated Sep. 14, 2016, Application No. 2,673,352, 3 pages.
Young, Lee W., Transmittal of International Search Report and Written Opinion dated Mar. 7, 2011 in Applicants' co-pending PCT International Application No. PCT/US2011/020584.

* cited by examiner

AUCTION FOR EACH INDIVIDUAL AD IMPRESSION

CROSS REFERENCE TO RELATED APPLICATION

This application claims the benefit under 35 U.S.C. Section 119(e) of a provisional application U.S. Ser. No. 60/876,026, entitled "Auction For Each Individual Ad Impression," filed Dec. 19, 2006, which is incorporated by reference herein.

FIELD

The subject matter described herein relates to data processing and, in particular, presenting an ad based on an evaluation of bids.

BACKGROUND

Advertisers try to reach consumers in a variety of ways. One of those ways is through web-based advertising on the Internet. A common way for advertisers to reach consumers on the Internet is by presenting ads in web sites, either as a pop-up window or embedded within the web page being viewed by the consumer. Web sites, such as MSN, MySpace, and Yahoo, rely on advertising as an increasingly important source of revenue. But unless advertisers realize returns from advertising on a web site (e.g., in the form of a purchase or a visit to the advertiser's web site), advertisers may reduce or even stop advertising on the web site. Accordingly, web sites have an interest in selecting an ad that generates revenue for the web site and provides some form of return to the advertiser.

SUMMARY

The subject matter described herein relates to systems, methods, and articles including computer-readable media to enable an auction (e.g., bidding) for presenting ads for each impression as the impression (e.g., a web page) is served and/or rendered.

In one aspect, there is provided a method for polling, by a script at a browser, one or more servers by sending messages to the one or more servers. The one or more messages may solicit one or more bids for presenting an ad at the browser. The one or more messages may also enable access to information at the browser. The information may be relevant to the one or more servers making the one or more bids. The script may receive one or more responses from the one or more servers. The one or more responses include the one or more bids. The script may also evaluate the one or more bids, and select one of the bids based on the evaluation.

In some variations, the servers are solicited by the bids by enabling the servers to respond to the bids. The polling may also enable access to information included in one or more cookies at the browser. The messages may include information representative an amount. The evaluation may determine whether at least one of the bids exceeds a minimum bid amount. A default bid may also be evaluated as one of the bids. A default bid may be defined as one of the bids, when the bids do not exceed a value representative of a minimum bid amount. A default bid may be defined as one of the bids, when at least one of the bids is not received. The default bid corresponding to the default ad may be selected. The script may be implemented as JavaScript. A webpage including the script may be accessed and then provided to the browser. When a second access occurs, another script indicating the location of another server capable of evaluating bids may be provided. The one or more servers may evaluate context information associated with the ad to determine whether to bid on the ad. The polling may be implemented for each opportunity to place an ad. The script may include at least one of the following: a location of the one or more servers, a location of a default ad, and a factor to adjust at least one of the bids. The ad corresponding to the selected bid may be presented.

In an interrelated aspect, there is provided a method for polling one or more servers by sending messages from a user interface to the one or more servers. The one or more messages may solicit one or more bids for presenting an ad at the user interface. At the user interface, an ad may be provided. The provided ad selected based on the one or more bids.

In an interrelated aspect, there is provided a method for receiving a message generated by a script at a browser. The message may be used to poll a server and solicit a bid for presenting an ad at the browser. The message enables access to information at the browser. The information may be relevant to the server making the bid. The received message may be forwarded.

Articles are also described that comprise a tangibly embodied machine-readable medium (e.g., a computer-readable medium) embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DETAILED DESCRIPTION

An advertising impression is an individual instance when an advertisement (ad) is shown to a particular user. For example, when a user selects a web page to view, that instance of the web page may provide one or more opportunities for an ad impression (also referred to as an "impression"). If the user selects to view another web page, the other web page may provide one or more additional opportunities for an ad impression, i.e., another instance when an ad can be presented to the user. The subject matter described herein relates to systems, methods, and articles including computer-readable media to enable an auction (e.g., bidding) for presenting ads for each impression as the impression (e.g., a web page) is served and/or rendered.

Figure 1:
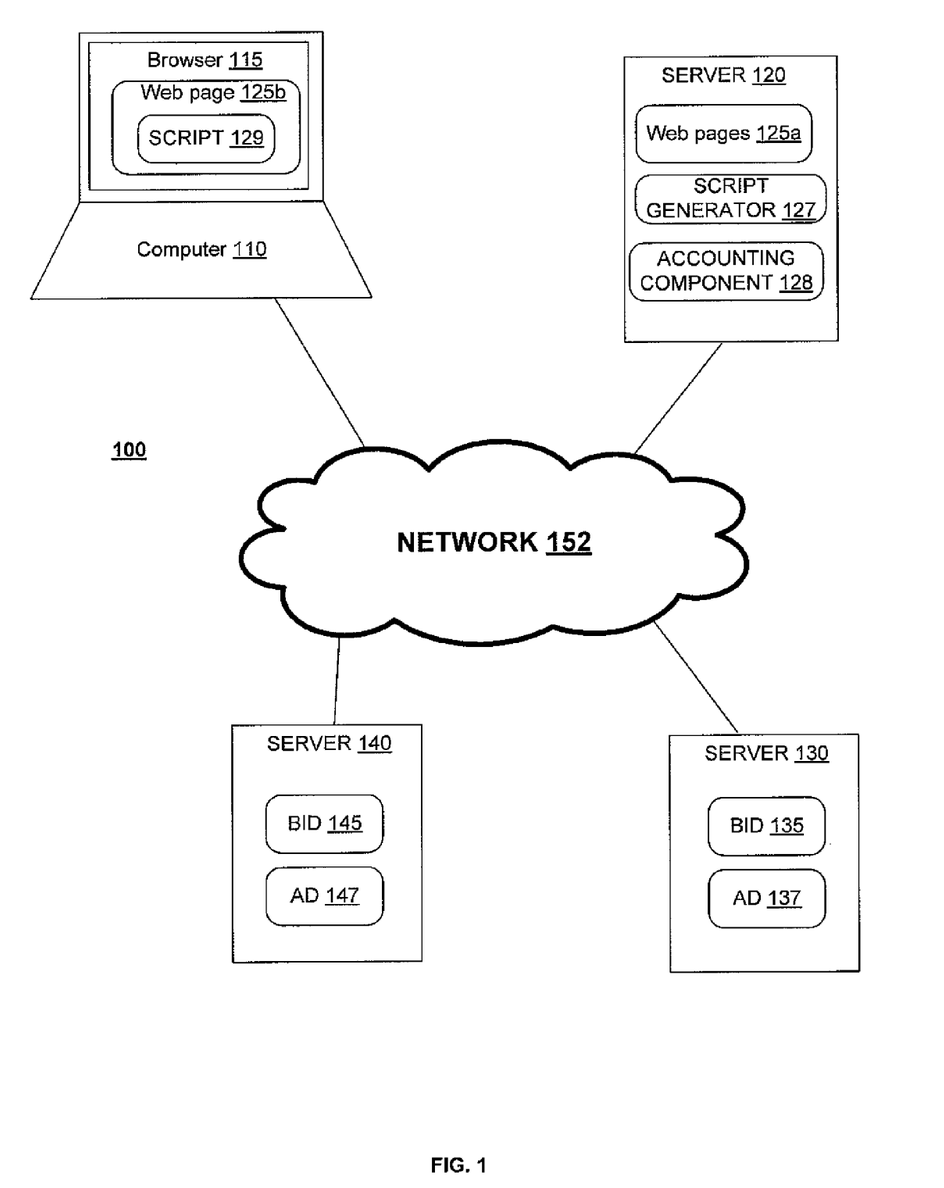
FIG. 1 is a block diagram illustrating a system for presenting ads based on bids.

FIG. 1 depicts a system 100 including a computer 110 coupled to servers 120-140 through a network 152, such as the Internet or any other communications medium. The computer 110 includes a browser 115. A browser (also known as a web browser) is a software application used to locate and display information content, such as web pages. A web page is a document on the web. For example, a web page may be implemented as HTML (Hyper Text Markup Language) files and/or any related files for scripts and graphics, as well as hyperlinks to other documents on the web.

The server 120 may include content information, such as one or more web pages 125a or other information content (e.g., music, television, video, and the like), all of which can be provided to browser 115. The server 120 may include a script generator 127 for generating scripts and an accounting component 128 for tracking the number of times an ad is provided to a browser for presentation and tracking any clicks on that ad.

Although FIG. 1 depicts script generator 127 and accounting component 128 included within server 120, script generator 127 and/or accounting component 128 may be located anywhere and in multiple locations. For example, in some implementations, server 120 may redirect the request to one or more other servers, such as server 130, server 140, and/or an ad server, i.e., a server that stores, links, and/or delivers ads. When that is the case, script generator 127 at the other server provides script 129, which may be inserted into information, such as web page 125b. Moreover, that other server may be able to serve ads to browser 115 as well. Moreover, although servers 120-140 are depicted as individual servers, each of servers 120-140 may be implemented as a plurality of servers.

The script generator 127 generates scripts, such as script 129, that are embedded in a web page, such as web page 125b, and provided to browser 115. The script 129 polls servers 130 and 140 to solicit an indication of whether servers 130 and 140 are interested in presenting an ad for a pending impression, such as the impression associated with web page 125b. The indication may be in the form of bids 135 and 145. The script 129 may poll each of the servers 130 and 140 by sending a request (e.g., a message) to solicit a bid for the impression (e.g., web page 125b).

The servers 130 and 140 may evaluate the impression by directly accessing context information associated with computer 110, browser 115, or a corresponding user (e.g., IP addresses and related demographics, cookie information from past interactions with each of the servers 130 and 140, as well as other information at server 120 provided through script 129, such as information identifying the location of the web page where the impression is occurring). The servers 130 and 140 may then respond with messages providing bids to script 129. The bids may be in any form indicative of an interest to place an ad. For example, the bid may be a simple yes or no indication, a monetary value (e.g., Dollars or Euros), a score, or a prediction of how well the ad will do if placed. The script 129 evaluates the bids and selects an ad to place in the impression—in this case, web page 125b. For example, script 129 may reject both bids and select a default ad previously selected by server 120, select the highest bidder, or select a lower valued bidder (e.g., when a preferred advertiser has a lower monetary bid).

The selected ad may then be provided, either directly as HTML or by reference (e.g., a hyperlink to another server), to computer 110. The browser 115 may then present the selected ad by, for example, rendering the selected ad in a frame of web page 125b. Although the previous example describes the ad as being included within a frame of browser 115, the ad may be presented to a user of computer 110 and browser 115 in a variety of ways including one or more of the following: as a pop-up window, as an email, as a phone call, as visual content, as audio content, embedded in a video, embedded in television, embedded in a mobile device (e.g., a mobile phone or the like), embedded in map data, and any other presentation mechanism. The script 129 thus enables selection of ads on a per impression basis and enables servers to place bids on those ads on a per impression basis. Moreover, since script 129 polls servers 130 and 140, servers 130 and 140 may each directly access the context information independently of other servers. The servers 130 and 140 may thus independently gather whatever information they deem relevant to making a bid.

In some implementations, the server 120 may be implemented as a so-called "publisher" (also referred to as a publisher server or web site) that publishes information content, such as web pages. An example of a publisher is Yahoo, MSN, or any other web site that provides information content. In some implementations, the server 120 may not be a so-called publisher. When that is the case, the server 120 may receive redirects from other servers and then insert, using script generator 127, scripts (e.g., script 129) into a web page that is served to browser 115 or computer 110. The server 120 may also include an ad server for serving ads as well as scripts, such as script 129.

The server 120 may also function as a controller (also referred to as an "active server") that actively controls ad placement. When that is the case, server 120 may track using accounting component 128 which ads are inserted into web page 125b, so that the appropriate advertiser can be billed for selected ads.

In some implementations, servers 130 and 140 may be implemented as ad servers for advertisers (and advertising networks) bidding on impressions. Moreover, system 100 may provide a real-time bidding exchange that dynamically optimizes the value of each impression. The system 100 allows the advertiser (e.g., servers 130 and 140) to directly access a user's browser 115 and computer 110 using standard Internet protocols, which allow server 110 to obtain various context information that the advertiser would otherwise only have access to after having secured an impression from an ad server.

An example of context information is cookie information previously recorded to computer 110 by another server, such as server 130, during interactions with browser 115. The cookie information may include any information known to the advertiser about the computer 110 or browser 115, such as ads already shown to the user of browser 115, whether a user clicked on any of those ads or completed a sale as a result of being shown one of those ads, websites (affiliated with server 130) that the user has visited or made a corresponding purchase, and the like. Another example of such context information is the IP (Internet Protocol) address assigned to computer 110, which can be used to infer information such as the physical metropolitan area where the computer is located and the type of connection (e.g., a cable modem, DSL (Digital Subscriber Line) line, dialup modem, T-1 line, and the like) being used to connect computer 110 to the Internet (e.g., network 152). Other examples of context information available to the advertiser are the type of operating system being used at computer 110, the type of browser 115 being used at computer 110, the language preference selected at computer 110, and other such technical details about the configuration of computer 110 and browser 115.

Moreover, server 120 may also include information in script 129 that might be relevant to advertisers (or their servers, such as server 130 and 140). The script 129 may provide the information to the advertisers when it calls servers 130 and 140. For example, the relevant information might include information about the web page the user at browser 115 is visiting (e.g., that the web site is a personal finance related page) or other information known by server 120 (and placed in script 129) about the user (e.g., that the user is a 25 year-old male interested in movies).

Figure 2:
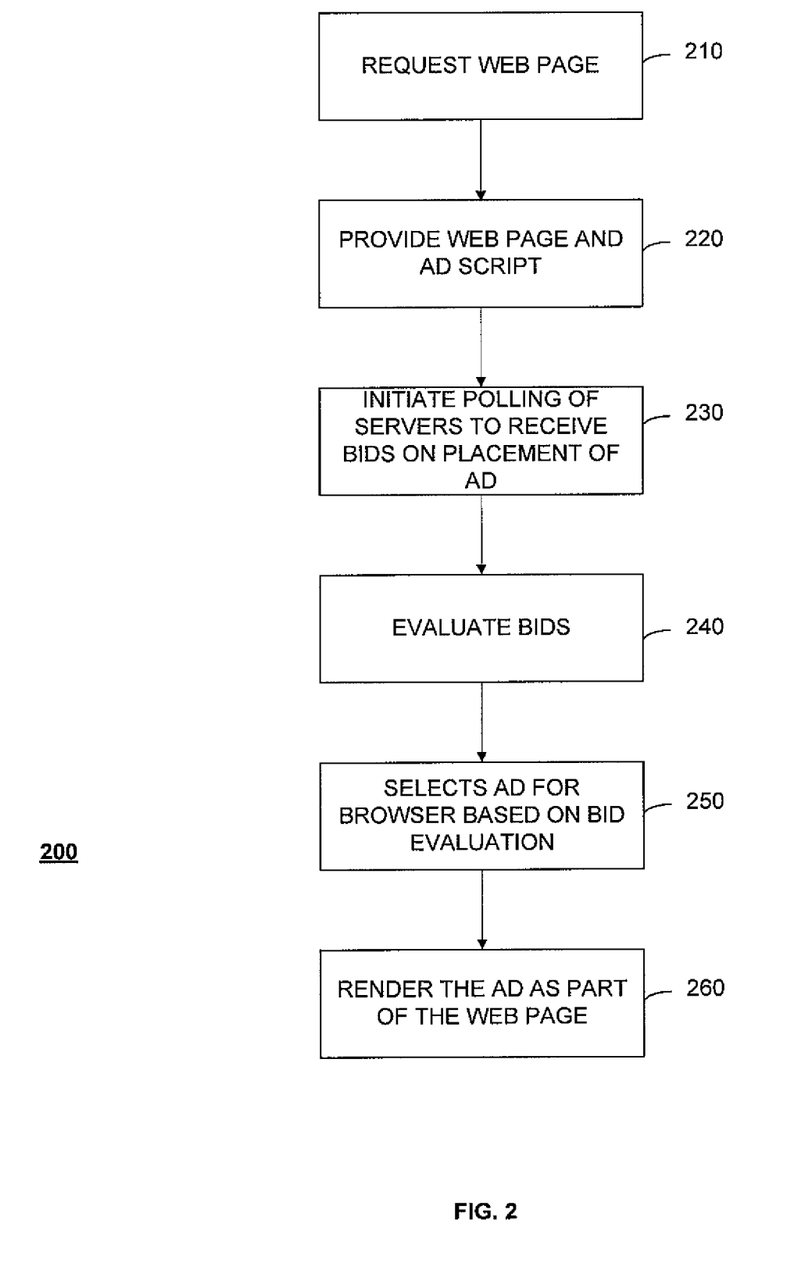
FIG. 2 is a process flow diagram illustrating a method for presenting ads based on bids.

FIG. 2 depicts a method 200 for presenting ads based on bids. Referring to FIGS. 1 and 2, browser 115 requests a web page from server 120 (block 210). At 220, server 120 may respond to the request by providing to browser 115a web page 125b and a script 129, embedded within web page 125b by script generator 127.

At 230, when web page 125b and script 129 are received at browser 115, script 129 polls one or more servers 130 and 140 to solicit bids for presenting ads associated web page 125b. The script 129 may send one or more messages to poll servers 130 and 140. To enable servers 130 and 140 to assess whether to bid on the impression (e.g., presenting an ad in connection with web page 125b), the messages to servers 130 and 140 may include (or provide access to) one or more of the following: a minimum bid amount, the identity of server 120, the exact page or web site onto which the ad might be served, and context information representative of the user of browser 115 (e.g., identity, demographic information, past interactions with server 120 or other affiliated servers, and past purchases with other affiliated servers known to server 120 at the time it generated script 129). The servers 130 and 140 may then provide bids to script 129. As described above, the bids may be in any form that expresses an interest in presenting an ad. For example, the bid may take one or more of the following forms: a yes indication to present an ad, a no indication rejecting the bid from script 129, and a value in response to the bid message from script 129.

At 240, script 129 evaluates any bids 135 and 145 received from servers 130 and 140, as well as the bid for the so-called default ad provided by server 120 and/or script 129. For example, the default bid may be 1 cent, bid 135 may be 2 cents, and bid 145 may be 3 cents. In this example, script 129 evaluates the three bids and selects server 140 and ad 147. Although the previous example describes evaluating three bids, more or fewer bids may be evaluated as well.

Moreover, script 129 may include a timeout feature, so that a default ad is selected unless an appropriate bid is received from servers 130 or 140 within a predetermined time limit (e.g., ½ second).

At 250, script 129 may select an ad to provide to browser 115. The selection of an ad may include providing the ad, such as HTML content for the ad or, alternatively, a URL (Uniform Resource Locator) link to the ad. The ad may include a call back to server 120 and possibly a call back to server 130 or 140 in order for servers 120, 130, and/or 140 to properly account for the final disposition of the impression.

At 260, the ad (e.g., ad 147) is then rendered at computer 110 and/or browser 115. The ad may take the form of another script as in 220 (but without a web page) provided by server 130 or 140, which initiates another round of bidding to still other servers. When a user selects another web page from web pages 125a, script generator 127 may dynamically embed another script into the other web page.

In some implementations, HTML scripting technology is used to implement script 129, including JSON (JavaScript Object Notation), DOM (Document Object Model), and AJAX (Asynchronous JavaScript and XML). Although the aforementioned technologies may be used, other technologies may be used to implement script 129. The script 129 may also be generated dynamically, i.e., generated for each impression. Alternatively, the script 129 may not be dynamic, but rather included in a server (e.g., a web site) regardless of whether the server includes a script generator 127. When that is the case, the script may requests bids from the same servers each time until the script is edited or replaced.

The server 120 may also include a yield optimization component to determine which ad to use as the default ad and which servers should be polled by script 129 when soliciting bids for an impression. For example, the yield optimization component may evaluate the user's or browser's past interactions (e.g., purchases) to determine whether to list in script 129 a server for an ad. A yield optimization component uses any of a number of potential methodologies to evaluate available context information about an impression, historical results for the various available ads, and the various requirements of the potential advertisers to determine which ad should be served for an impression or which ad and bidders should be included in a script, such as script 129. Yield optimization may be implemented as a component of an ad server, and ad servers may make decisions about ads to serve without utilizing yield optimization using any other decision methodologies.

Figure 3:
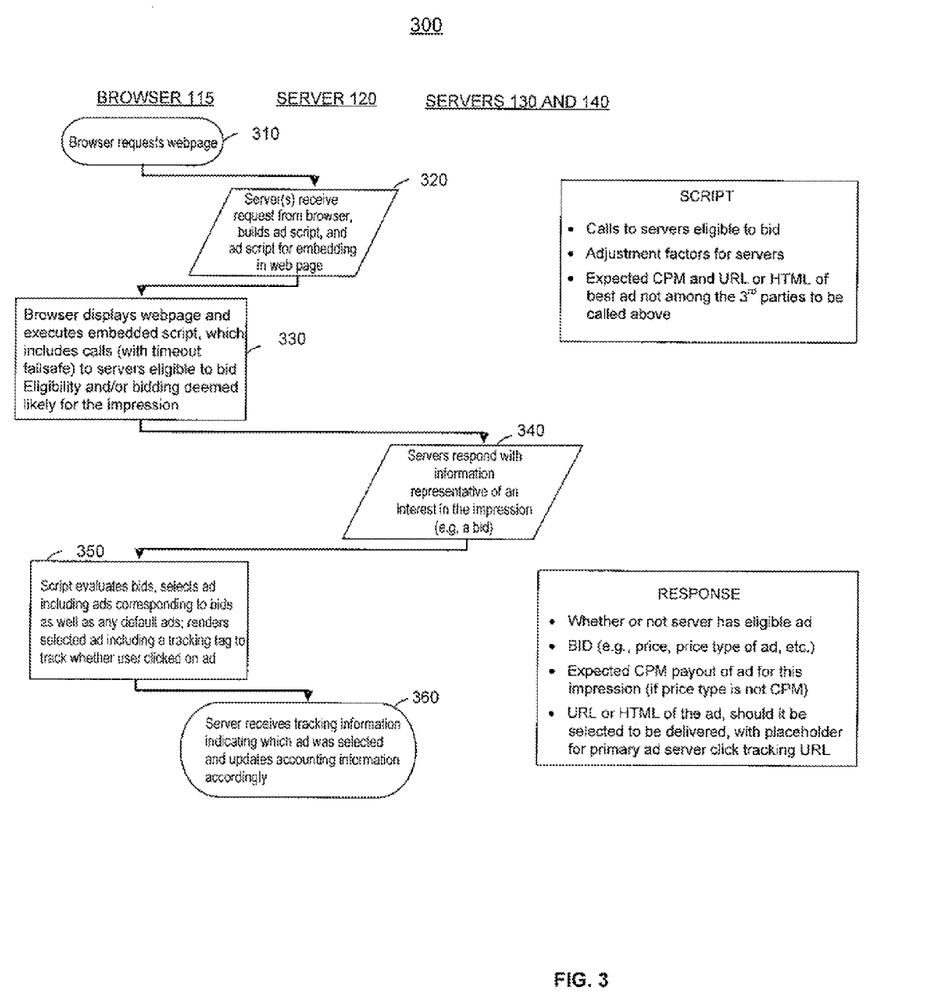
FIG. 3 is another a process flow diagram illustrating a method for presenting ads based on bids.

FIG. 3 depicts another method 300 for presenting ads based on bids. At 310, browser 115 requests a web page from a server, such server 120. In the implementation of FIG. 3, server 120 is implemented as a publisher server that provides web pages to browsers, although other types of servers may be used.

At 320, server 120 may receive the request from browser 115, build script 129 using script generator 127, and return web page 125b and script 129 to browser 115 through network 152. In some implementations, script 129 is generated dynamically for each user request for a web page. When that is the case, server 120 may provide script 129 that is yield optimized for that specific impression. For example, based on the type of impression and the particular user, server 120 may select a default ad with the greatest predicted performance of such ads available to server 120, select bidders most likely to bid on the impression, and include the selected default ad and the selected bidders in script 129. In other implementations, the script 129 is not generated dynamically but rather hard-coded into web pages 125a and 125b.

The script 129 may include the code necessary to perform one or more of the following: polling of the servers (including URLs to locate the servers); receiving bids; evaluating bids; selecting an ad based on the evaluation; and providing (or serving) the appropriate ad content to the browser. The script 129 may also include information about alternative ads should one of the ads from servers 130 and 140 not yield a bid or one of sufficient amount. For example, a default ad may be designated to have a bid value of 5. If bid values of 2 and 4 are received from servers 130 and 140, respectively, script 129 may select the default ad for the impression. The script 129 may also include adjustment factors to be applied to the bids received from servers 130 and 140. For example, a factor may take into account the relative priority for delivery of ads from the different downstream servers 130 and 140 based on factors other than price, such as other elements of the business relationship, past discrepancies in the value of impressions delivered to servers 130 or 140, and the speed that ads are being served from servers 130 and 140. The script 129 may include adjustment factors for different categories of ads. For example, a woman's cosmetic ad may be factored lower than a car tire ad when the impression is for a sports web site. The above-described factors may be used to increase or decrease the value of bids received from servers 130 and 140. The script 129 may also include a URL of a counting web site (or server) to track which ad was selected and any other information desired for tracking ad performance.

At 330, script 129 executes and then calls servers 130 and 140, identified in script 129 as supporting a bid request. The bid request may include information identifying (to servers 130 and 140) the source of the bid request. The bid request may also include (or make accessible) additional information, such as user profile information, cookie information, and the like.

At 340, servers 130 and 140 respond with messages including bids. Before making the bids, servers 130 and 140 receive messages from script 129 (or browser 115) and receive cookies associated with browser 115 and the server receiving the message. The cookies may provide context information, such as the frequency that a browser has seen an ad, user behavior, and other historical information that servers 130 or 140 have known at the time of past communications with computer 110. Each of servers 130 and 140 may then determine pricing (or estimated value) under which they would provide a responsive bid to script 129.

In some implementations, if script 129 provides an estimated price to servers 130 and 140, it may also get the actual price type and price upon which the actual payout will be made. If the price was pre-negotiated on a CPM basis, then the response from servers 130 and 140 may be in the form of a yes or no to the impression. Otherwise, the servers 130 and 140 may need to provide an amount with the bids for the impression. But the bid could either be a fixed amount that servers 130 and 140 promise to pay if they get the impression (meaning the bid is also on a CPM basis), or it may just be a soft estimate of how much they will pay. In the case of giving an estimate, servers 130 and 140 may provide the actual price type and price under which the actual payment would be made. Examples of price types include the following: CPM represents a fixed dollar amount per 1,000 impression; CPC represents a fixed dollar amount per click; CPA represents a fixed dollar amount per sale; CPL represents a fixed dollar amount per lead; CPV represents a fixed dollar per view; and CPR (or revshare) represents a fixed percentage of sales value. For example, assume server 130 determines the best ad to serve is an ad for which it will pay $0.25 if the user clicks (e.g., CPC). If the estimated chance that the user will click is 5%, then the estimated value that server 130 will pay for this one impression is $0.0125 (5% multiplied by $0.25, which is a $12.50 CPM). The server 130 is not promising to pay $0.0125 if they get the impression; server 130 is essentially estimating what it is likely on average to pay given a predicted 5% chance of getting a click.

The messages sent at 340 may include one or more of the following: whether or not an ad is available to be placed; the bid (either the actual or estimated amount that will be paid if the bid is won); the actual price type and price should the bid only be an estimate; and a URL or HTML of the ad should it be selected as the winning bid. The servers 130 and 140 may also update (or provide) cookie information at browser 115.

At 350, script 129 evaluates any bids received from servers 130 and 140 by comparing the bids from servers 130 and 140. If the bids from server 130 and 140 do not exceed a threshold value, script 129 may use a default ad identified in script 129 or identified by server 120. Based on the evaluation, script 129 may then select an ad and notify server 120 which ad was selected, so that server 120 and accounting component 128 can track which ad was selected for billing purposes.

In some implementations, script 129 may wait up to a predefined period of time before selecting an ad as part of the bid evaluation described above. If no bids are received within the predetermined time period, script 129 may use a default ad identified in script 129 or identified by server 120.

At 360, server 120 may receive tracking information indicating which ad was selected by script 129. This can be accomplished by having the script send a message from the browser 115 to the server 120 identifying the ad or bidder selected. In addition, the script 129 may include (in the HTML content of the ad or URL link to the ad) an additional URL that the browser 110 will call in the event that the user clicks on the ad, to facilitate the reporting of such clicks by server 120. The script 129 may also include other information for the advertiser, such as an ID for the advertiser to utilize when reporting back to server 120 any sales that result from serving the ad, in order to track ad performance. In addition, server 130 or 140 may be notified if they are the winning bidder. To that end, servers 130 and 140 may include (in the HTML content of the ad) a URL for browser 110 to call when the HTML content of the ad is served or, alternatively, by counting whether a call at the URL link is received from browser 115. Moreover, script 129 and web page 125*b* may be implemented in a variety of format including HTML, images, audio, a Flash file, audio, and/or map data.

Figure 4:
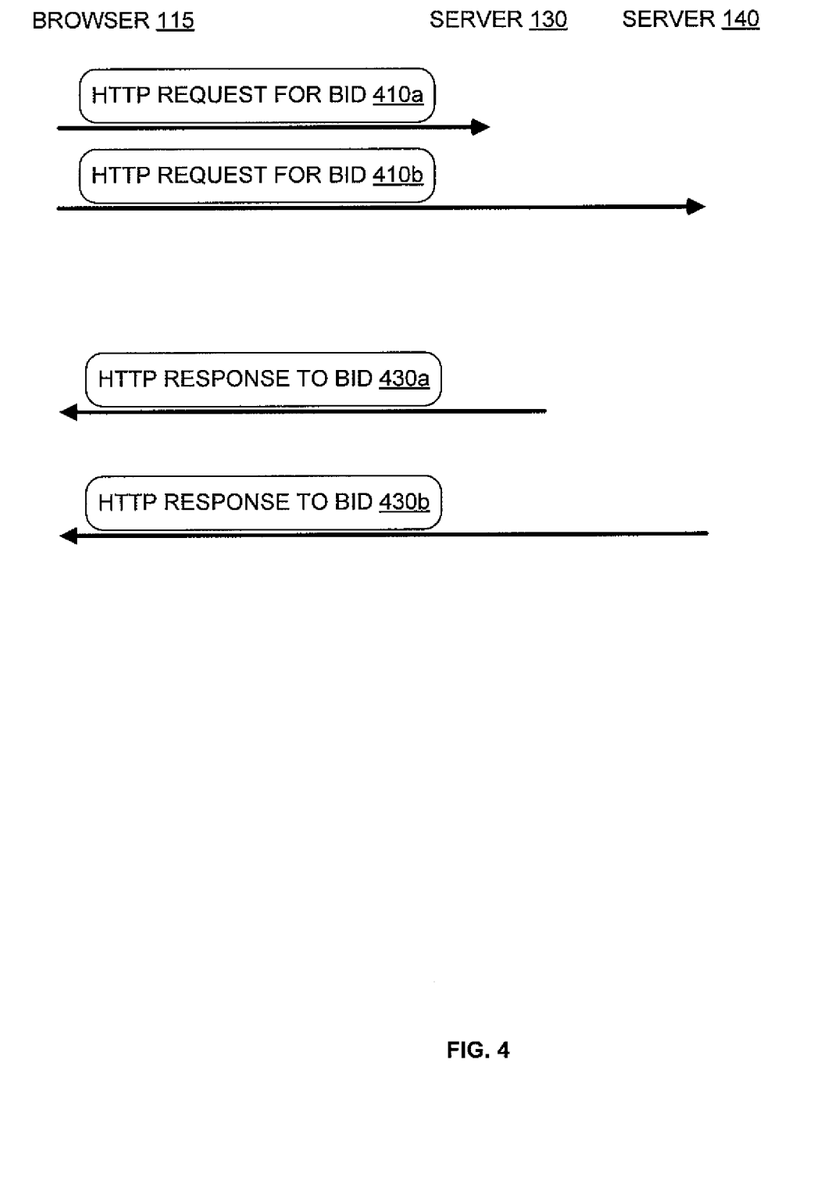
FIG. 4 depicts a messages exchange when bidding for ad placement.

FIG. 4 depicts messages exchanged between browser 115 and one or more servers 130-140. The script 129 at browser 115 sends messages 410*a* and 410*b* through network 152 to server 130 and 140. The server 130 is capable of responding to the bid request and thus responds with a message 430*a* including a bid. The server 140 is also capable of responding to the bid request; server 140 then responds with a response message 430*b*. The messages 410*a-b* and 430*a-b* may be received and or forwarded by one or more of the following: routers, modems, servers, Internet Service Providers, and the like. In some implementations, a response message to a bid request may include information about the bidder's desire to receive more bid requests. For example, the response message may specify a time period for the bidder does not wanted to be solicited for another bid. The bid request may include other information that is material to the bidder in preparing a bid response. For example, the bid request may include one or more of the following: information about what type of page or content the user is viewing and/or demographic and past behavioral information known by the publisher about the user; enables a bidder to specify a number of minutes for which they will not be called by the user's browser again for a type of bid; enables including other information in a bid request (e.g., information shared with a bidder which may be of help when utilizing the impression); and tracking back what happened in the auction Table 1 below lists an example implementation of script 129.

TABLE 1

```
// Patent Pending technology
// This script is dynamically generated by an active server, or statically
// embedded into the publisher web page, or a combination of both
// Object containing data and logic for executing the auction
var SDCAdAuction = {
        // primary bid, served by the active server
        primarybid: {"result": {"id":"primary","cpm":11.8,"ad":"http://primary-server.com/adopt?k=9213121391jajsadjayu8712nhsadhaHDSAHJAnasdaj"}},
        // url to be called to register winner and data collected from bidders
        trackurl: "http://primary-server.com/bid-track/?k=[WINNERK]&d=[DATA]",
        bids: new Array( ), // array to accumulate the various bids
        idx:0,
        winnercpm:−10000, // auxiliary variable to compute the winner cpm
        winneridx:−1, // auxiliary variable to compute the winner cpm
        maxwaittime:1000, // max time to wait before timing out on waiting for the bidders to respond
        startwaittime:10, // auxiliary variable for timeout computation
        waittimesofar:10, // auxiliary variable for timeout computation
        deltawaittime:10, // auxiliary variable for timeout computation
        totalbidders: 3, // total number of bidders, not including the primary
        width: 468, // width of banner requested
        height: 60, // height of banner requested
        time: (new Date( )).getTime( ), // used to generate cache buster, to avoid browser caching
        // information regarding the participating bidders, return
        // bidurl: the url to call the bidder with, that url will return a JSON object with the bid
        //       note the possibility of passing information to the bidder with parameter info
        //       this info could be demographic information about the user known only to the primary server
        // k: the info for the active server to track an impression in case this specific bidder is chosen
        // trackc: the url for the active server to track a click in case this specific bidder is chosen and clicked on,
        // this url must be passed on the downstream server
        // adjf: adjustment factor computed by the active server
        bidders: {
                "bidder1":
        {"bidurl":"http://www.bidder1.com/getJSONbid?id=bidder1&callback=[CALLBACK]&rnd=[CACHEBUSTER]&info=Amansdkj12893u1amndkl1",
        "k":"ASKJD9231asdkjasdj9213njasdkads19203I213MASNDDDASDNwjwkerj",
                        "trackc":"http://primary-server.com/track-click/?k=ASKJD9231asdkjasdj9213njasdkads19203I21SMASNDDDASDNwjwkerj
",
                        "adjf": 1.1},
                "bidder2":
        {"bidurl":"http://www.bidder2.com/getJSONbid?id=[ID]&callback=[CALLBACK]&rnd=[CACHEBUSTER]&info=Amansdkj12893u1amndkl1",
        "k":"A271839231asdkjasdj921273NJJJJjasdkads13MASNDDDASDNwjwk",
                        "trackc":"http://primary-server.com/track-click/?k=A271839231asdkjasdj921273NJJJJjasdkads13MASNDDDASDNwjwk",
                        "adjf": 0.98 },
                "bidder3":
        {"bidurl":"http://www.bidder3.com/getJSONbid?id=[ID]&callback=[CALLBACK]&rnd=[CACHEBUSTER]&info=Ama213W12393u1SADHdkI1",
        "k":"A2718453231asdkjasdj921273NJJJJjasdkads13MASNDDDASDNwjwk",
                        "trackc":"http://primary-server.com/track-click/?k=A271839231asdkjasdj921273NJJJJjasdkads13MASNDDDASDNwjwk",
                        "adjf": 1.2}
                },
        // get's the head element of the DOM, to be used for dynamic script loading
        headElement: document.getElementsByTagName("head").item(0),
        // call back function, will be called by the return script of every bidder
        bid: function(json) {
                this.bids[this.idx++]=json;
        },
    // to be used to pass DATA collected from bidders, like their bid CPM and their mintime
    encode: function(str) {
        // encoding function
        return str;
    },
        // dynamically calls a specific bidder (url)
        // appends to the DOM a javascript-src call to the url
        callServer: function(url) {
                var script = document.createElement("script");
                script.setAttribute("type", "text/javascript");
```

TABLE 1-continued

```
                    script.setAttribute("src",url);
                    this.headElement.appendChild(script);
                    return script;
            },
            // Loops through all the bidders, and the primary bid
            // computes the winner (the max adjusted cpm) considering the adjustment
factors
            // displays the winner ad and send tracking information back to the primary
server.
            pickABid: function( ) {
                    var i;
                    var winnerid;
                    var winnerad;
                    var winnerk;
                    var data="";
                    this.winnercpm=this.primarybid.result.cpm;
                    for(i=0;i<this.idx;i++) {
                            if (this.winnercpm < this.bids[i].result.cpm *
this.bidders[this.bids[i].result.id].adjf){
                                    this.winnercpm=this.bids[i].result.cpm *
this.bidders[this.bids[i].result.id].adjf;
                                    this.winneridx=i;
                            }
                            // collect data about bidders: what they bid for (cpm), optional minimum
time before they get called again (mintime)
data+=this.bids[i].result.id+","+this.bids[i].result.cpm+","+(this.bids[i].result.mintime
==undefined ? 0 : this.bids[i].result.mintime)+";";
                    }
                    if (this.winneridx >= 0) { // one of the bidders has won
                            winnerid=this.bids[this.winneridx].result.id;
                            // take the appropriate k to be passed on the bid-tracking url
to store the winning impression
                            winnerk=this.bidders[winnerid].k;
                            // if the winner is a bidder, let's pass the click
                            // tracking url, expanding the macro [CLICKURL] with
                            // the appropriate trackc url
                  winnerad=this.bids[this.winneridx].result.ad.replace("[CLICKURL]",this.bidd
ers[winnerid].trackc);
                    } else { // the primary has won
                            winnerid=this.primarybid.result.id;
                            // the winner impression will be stored at the moment of
displaying the ad
                            winnerk="";
                            // in the case of the primary, there is no need of
                            // passing the click tracking url, it will be already
                            // embedded inside the ad
                            winnerad=this.primarybid.result.ad;
                    }
                    // build the track url, taking the winner k (if the winner is a bidder),
and all data
                    // collected from the bidders encoded
                    this.trackurl=this.trackurl.replace("[WINNERK]",winnerk).replace("[DATA]",t
his.encode(data));
                    // display the winner ad
                    this.showHTMLAdInIFrame(winnerad);
            // track DATA about all bidders
            // winner info impression if the winner is a bidder
            this.callServer(this.trackurl);
                    },
                    // function to display the ad on a pre made iframe
                    showHTMLAdInIFrame: function(url) {
                            window.frames["SDC__AdAuction__frame"].location=url;
                    },
                    // timer trigger function that check periodically (every deltawaittime), the
status of the bidders
                    // the function will end when either the bidders have all returned their bids,
or time is over (maxwaittime)
                    checkBiddersStatus: function( ) {
                            if (this.idx == this.totalbidders || this.maxwaittime <=
this.waittimesofar) {
                                    this.pickABid( );
                                    return;
                            }
                            this.waittimesofar += this.deltawaittime;
                            window.setTimeout("SDCAdAuction.checkBiddersStatus( )",this.deltawaitti
me);
                    },
                    // loops through bidder structure, replaces the MACROS([CALLBACK],
[CACHEBUSTER]),
                    // and calls bidder using dynamic script loading
```

TABLE 1-continued

```
        callBidders: function( ) {
            var i;
            for (i in this.bidders) {
                var
url=this.bidders[i].bidurl.replace("[CALLBACK]","SDCAdAuction.bid").replace("[CA
CHEBUSTER]",this.time);
                var script=this.callServer(url);
            }
        },
        // creates an empty iframe, to be used to display the ad once picked
        createIframe:function( ) {
            document.write("<iframe name='SDC__AdAuction__frame'
width='"+this.width+"'" height='"+this.height+"'" frameborder='0' scrolling='no'
marginheight='0' marginwidth='0' topmargin='0' leftmargin='0'
allowtransparency='true' ></iframe>");
        }
    }
}
// creates the iframe
SDCAdAuction.createIframe( );
// call all bidders
SDCAdAuction.callBidders( );
// check if the bidders are done, or time is out, and display the winner
window.setTimeout("SDCAdAuction.checkBiddersStatus( )",SDCAdAuction.startw
aittime);
```

Table 2 depicts an example of a message including a bid returned from one of the servers, such as servers 130 and 140, to script 129.

TABLE 2

```
// Patent Pending technology
// Example return from a bidder
// If the bidder is called with the following url:
//
http://www.bidder1.com/getJSONbid?id=bidder1&callback=SDCAdAuction.bid&rnd
=217213871818
// the bidder will return the something like this:
SDCAdAuction.bid({"result":{"id":"bidder1","cpm":10,"mintime":60,"ad":"http://www.
bidder1.com/ad?12837sand198KJSADj921u391mxhday98219831729&click=[CLI
CKURL]"}});
// where
//
{"result":{"id":"bidder1","cpm":10,"mintime":60,"ad":"http://www.bidder1.com/ad?12
837sand198KJSADj921u391mxhday98219831729&click=[CLICKURL]"}}
// is the actual JSON object
// with id (bidder1) is the id passed on the url
// cpm is their bid
// mintime is an optional field with which the bidder can instruct the primary server
not to call
//      them for this user for at least the amount of minutes specified
// ad is the url of the ad to be displayed if they win
// [CLICKURL] is a macro to be expanded by the SDCAdAuction script with the
// appropriate click tracking url
// All is wrapped on a callback function passed in input in the url
// SDCAdAuction.bid
```

Although the above describes only servers 120-140 and computer 110, a plurality of servers and computers may be implemented as well.

Moreover, although the above describes a browser as the user interface to information including ads, other types of user interfaces may be used as well. Moreover, these other types of user interfaces may include script (or code) used to poll servers to solicit bids on ads, receive bids, evaluate bids, select a bid, and/or present the ad of the winning bid, as described above. Moreover, the above-described bidding process may be used in a user interface capable of serving Internet advertisements outside of the browser. For example, the above-described bidding process may be used to select and present advertisements to be displayed within a video or audio player application (e.g. Adobe Flash, Windows Media Player, or iTunes), gaming applications, and calendar applications. In the cases of such applications, the script may be embedded as code in the application, so that advertisers can be polled on whether they would like to present an ad. The script (or code) may be used to poll advertisers and an ad may be provided for presentation at the user interface. In the case of a video or audio player application, the ad of the winning bidder may be displayed before, after, or during one or more video or audio programs, and the ad may include one or more of text, graphics, video, and audio.

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, script, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input. The computer may be implemented as a processor (e.g., a central processing unit or the like), router, or any other device including a processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed:

1. An article comprising a non-transitory, tangible machine-readable medium embodying instructions, that when executed by a computer system cause the computer system to perform operations comprising:
   transmitting over a network, using a user browser, a request for a web page to a first server;
   receiving over the network the requested web page into which an ad is to be inserted;
   receiving, by the browser, a script from a second server;
   requesting bids, by the browser using the script, from a plurality of bidder servers by sending messages to the plurality of bidder servers, the messages soliciting one or more bids for presenting an ad by the browser;
   providing information by the browser to at least a portion of the plurality of bidder servers, the information including at least
   information about the web page, into which the ad is to be inserted,
   receiving, by the browser, one or more responses from responding bidder servers in the plurality of bidder servers, the one or more responses including respective bids;
   evaluating, using the script, the responding bidder servers' bids and providing an evaluation result, wherein evaluating includes assigning an adjustment factor to at least one of the bids, and the adjustment factor is assigned based at least in part on
   discrepancies in a monetary value of impressions delivered to at least a first responding bidder server and a second responding bidder server;
   selecting, using the script, one of the bids based at least in part on the result the evaluation;
   causing a notification to be transmitted by the script at the browser to the ad server that submitted the selected bid;
   receiving by the browser, from the ad server that submitted the selected bid, a link to a first ad; and
   accessing the first ad using the link.

2. The article of claim 1, wherein requesting bids further comprises:
   providing information included in one or more cookies at the browser.

3. The article of claim 1, wherein receiving one or more responses further comprises:
   receiving one or more messages including information representative of an amount.

4. The article of claim 1 the operations further comprising: evaluating a default bid as one of the one or more bids.

5. The article of claim 1 the operations further comprising: presenting the ad corresponding to the selected bid.

6. The article of claim 1 the operations further comprising: defining as one of the bids, a default bid for a default ad.

7. The article of claim 6 the operations further comprising: selecting the default bid corresponding to the default ad.

8. The article of claim 1 wherein the script further comprises JavaScript.

9. The article of claim 1 the operations further comprising:
   receiving at the browser another script including a location of a third server capable of evaluating bids.

10. The article of claim 1 wherein the script comprises at least one of the following: information identifying a location of the plurality of bidder servers, information identifying a location of a default ad, or information identifying a factor to adjust at least one of the bids.

* * * * *

UNITED STATES PATENT AND TRADEMARK OFFICE
CERTIFICATE OF CORRECTION

PATENT NO. : 9,886,718 B2
APPLICATION NO. : 11/959385
DATED : February 6, 2018
INVENTOR(S) : Jason J. A. Knapp It is certified that error appears in the above-identified patent and that said Letters Patent is hereby corrected as shown below:

In the Specification

In Column 8 at Line 48, Change "and or" to --and/or--.

In Column 8 at Line 65, Change "and or" to --and/or--.

In Columns 9-10 at Line 44 (Table 1), Change "19203I21SM" to --19203I213M--.

In Columns 9-10 at Line 56 (Table 1), Change "dkI1"," to --dkl1",--.

In the Claims

In Column 16 at Line 34, In Claim 1, change "part on the result the evaluation;" to --part on the results of the evaluation;--.

Signed and Sealed this
Twenty-second Day of May, 2018

Andrei Iancu
*Director of the United States Patent and Trademark Office*